UNITED STATES PATENT OFFICE.

JOHN C. H. KERR, OF PERRY, OKLAHOMA.

COMPOSITION OF MATTER FOR USE IN THE MANUFACTURE OF SOLID TIRES, LINERS, &C.

1,315,845.     Specification of Letters Patent.     Patented Sept. 9, 1919.

No Drawing.     Application filed February 24, 1919. Serial No. 278,943.

*To all whom it may concern:*

Be it known that I, JOHN C. H. KERR, a citizen of the United States, residing at Perry, in the county of Noble and State of Oklahoma, have invented a new and useful Composition of Matter for Use in the Manufacture of Solid Tires, Liners, &c., of which the following is a specification.

This invention relates to a composition of matter for use in the manufacture of solid tires for vehicle wheels, liners for pneumatic tires, and for similar purposes, one of the objects of the invention being to provide an efficient substitute for the rubber compositions usually employed for the above purposes and which substitute is less expensive than the ordinary material and can be easily manufactured.

With the foregoing and other objects in view the invention consists of the following ingredients compounded substantially in the proportions stated, to wit:

Cork (ground or sheet) _____ ¼ pound.
Fibrous matter (fabric or cords) _ ¼ pound.
Rubber cement _____ ⅛ pound.
Raw rubber _____ ½ pound.

The foregoing ingredients are properly prepared and mixed and cooked under pressure for about sixty minutes with steam at a pressure of fifty pounds. The resultant product can be used in making solid tires for automobiles and other vehicles and can also be used as an inner liner for the casings of pneumatic tires.

What is claimed is:—

A composition of matter for use in the manufacture of solid tires, casing liners and the like, consisting of the following ingredients substantially in the proportions stated, to wit, cork, ¼ pound, fibrous matter, ⅛ pound, rubber cement, ⅛ pound, and raw rubber, ½ pound.

In testimony that I claim the foregoing as my own, I have hereto affixed my signature in the presence of two witnesses.

JOHN C. H. KERR.

Witnesses:
L. A. BROWN,
N. S. BROOKHART.

Copies of this patent may be obtained for five cents each, by addressing the "Commissioner of Patents, Washington, D. C."